United States Patent [19]

Kiraly et al.

[11] Patent Number: 6,088,731
[45] Date of Patent: Jul. 11, 2000

[54] INTELLIGENT ASSISTANT FOR USE WITH A LOCAL COMPUTER AND WITH THE INTERNET

[75] Inventors: Jozsef Kiraly, San Martin; Peter M. Ridge, Milpitas, both of Calif.; Zoltan Holvath, Budapest, Hungary

[73] Assignee: Associative Computing, Inc., San Jose, Calif.

[21] Appl. No.: 09/066,086

[22] Filed: Apr. 24, 1998

[51] Int. Cl.[7] .................................................. G06F 17/30
[52] U.S. Cl. ........................ 709/229; 709/202; 709/217; 709/219; 709/226
[58] Field of Search ................................... 709/229, 202, 709/217, 219, 224, 225, 226

[56] References Cited

U.S. PATENT DOCUMENTS

| | | | |
|---|---|---|---|
| 5,524,195 | 6/1996 | Clanton, III et al. | 395/327 |
| 5,745,754 | 4/1998 | Lagarde et al. | 707/104 |
| 5,752,246 | 5/1998 | Rogers et al. | 707/10 |
| 5,796,952 | 8/1998 | Davis et al. | 709/224 |
| 5,799,298 | 8/1998 | Bingham et al. | 707/1 |
| 5,875,296 | 2/1999 | Shi et al. | 395/188.01 |
| 5,877,759 | 3/1999 | Bauer | 345/339 |
| 5,931,907 | 8/1999 | Davies et al. | 709/218 |

*Primary Examiner*—Zarni Maung
*Assistant Examiner*—Saleh Najjar
*Attorney, Agent, or Firm*—Wagner, Murabito & Hao LLP

[57] ABSTRACT

The present invention is an intelligent assistant for use with a local computer and with the Internet. The invention's intelligent assistant process includes various menus and training options for training the intelligent assistant to respond to various text, voice, and mouse gesture commands. In its preferred embodiment, the invention's intelligent assistant is represented by an animated character. The character can communicate back to the user through text, voice, and its own animated gestures. The invention's intelligent assistant automatically and constantly communicates with Internet sites of interest to a user and collects information of interest from those Internet sites. The collected information and updates to the collected information, including information that may not be displayed by a browser, are then communicated to the user in a variety of ways, including changing the behavior and the knowledge base of the intelligent assistant. For example, the invention may communicate the collected information of interest or updates to such information by text, voice, or by simply changing the shape of the animated character. The variety of different ways of communicating the information and updates to the information of interest keeps the user alert and interested in the information. In one embodiment of the invention, only those Internet sites that are authorized can be accessed by the intelligent assistant to gather information or updated information of interest to the user.

38 Claims, 14 Drawing Sheets

| GENERIC COMMANDS | INTELLIGENT ASSISTANT COMMANDS | |
|---|---|---|
| Begin Reading | are you hungry | play |
| Calculator | be quiet | real mode off |
| CD Player | bye | real mode on |
| Close | come back | record |
| Control Panel | come closer | screen saver |
| Enter | don't talk too much | sing a song |
| Escape | fall | something |
| Go To Sleep | fly down | speaker |
| Hide Commands | fly left | talk less |
| Internet Explorer | fly right | talk more |
| Maximize | fly up | talk to me |
| Media player | go away | tell me a joke |
| Minimize | go back | thank you |
| Notepad | goodbye | that's not a song |
| Paint | haha | that was awful |
| Pause Reading | hello | very nice |
| Restore | hello parrot | walk left |
| Show Commands | hi | walk right |
| Solitaire | how are you | what day is it |
| Sound Recorder | I don't know | what did you say |
| Stop Reading | I'm busy | what is today's date |
| Task Manager | I'm fine | what is your name |
| Volume Control | jump | what time is it |
| Wake Up | keyword off | what's up |
| Windows Explorer | keyword on | yes |
| Word Pad | no | you are annoying |
| | pardon me | you're welcome |
| | parrot | |

FIGURE 5B

INTELLIGENT ASSISTANT FOR USE WITH A LOCAL COMPUTER AND WITH THE INTERNET

BACKGROUND OF THE INVENTION

1. Field of the Invention

The present invention relates to the field of utilizing information on the Internet and computer implemented methods therefor. More specifically, the present invention relates to the field of computer implemented intelligent assistants for utilizing information on the Internet.

2. Background Art

The Internet is a large network made up of a number of smaller networks. It is made up of more than 100,000 interconnected networks in over 100 countries, comprised of commercial, academic and government networks. It has become commercialized into a worldwide information highway and data base, containing information on every subject known to humankind.

The proper and efficient use of the great amount of information available on various Internet sites has the potential of providing Internet users with a variety of information desired for businesses and individuals. In particular, those users interested in certain segments of the information available on the Internet or those users interested in certain specific Internet sites could benefit tremendously from having their specific information of interest available to them in an automated and interesting manner. Moreover, such users would benefit greatly from being constantly and automatically updated on new information as the new information becomes available on their sites of interest.

Due to the prevalence and popularity of the World Wide Web (also called the "Web") servers around the world, a great number of Internet users are particularly interested in receiving updated information of interest to them from various World Wide Web servers on the Internet. By way of background, the World Wide Web is an Internet facility that links documents locally and remotely. The Web document is called a Web page, and links in the page let users jump from page to page (hypertext) whether the pages are stored on the same server or on servers around the world. The pages are accessed and read via a Web browser such as Netscape Navigator or Microsoft Internet Explorer.

The Web has become the center of Internet activity since, among other reasons, Web pages, containing both text and graphics, are easily accessible via a Web browser. The Web contains the largest collection of online information in the world, and the amount of information is increasing. Current schemes for accessing a Web document require typing in the URL (Uniform Resource Locator) address of the home page in the Web browser. From there, the user starts surfing through the Internet via hypertext links to other documents that can be stored on the same server or on a server anywhere in the world.

The shear size of the information available on the Internet and the Web has made it a necessity for individuals and businesses to efficiently and constantly sift through the available information in order to find and organize the information that is of interest. Stated differently, individuals and businesses realize that the availability of information itself does not result in a competitive edge unless the information is reduced to a manageable size and unless the information so reduced in size is of interest and of value to the business or the individual.

Although surfing through the Internet and in particular the Web is accommodated by hypertext links, the pervading need of the Internet users to receive constant and efficient updates on the new information available on Internet sites of interest has not been adequately addressed by the present Internet applications. Various "search engines" such as Excite, Lycos, AltaVista and others are known that permit a user to search for specific information. However, such search engines must be used on a daily basis to ensure that the updated information is accessed. Moreover, almost any search string results in a huge number of documents and the user would not know which documents have already been ruled out as being of no interest. Further, the search engines do not focus on particular sites that are of interest to the user; they search the entire Internet. Also, slightly different search strings result in very different documents for the user to sift through and analyze. Additionally, no search engine has the capability of alerting a user to the occurrence of updates to information in the sites of interest to the user as soon as such updates occur. In other words, search engines do not automatically and methodically search the Internet to find updates on the information of interest to the user and search engines do not automatically and methodically alert users to such updates. Finally, today's search engines at best explore less than half of the existing Web sites for information and thus many Web sites remain hidden to users. These are only some of the shortcomings of relying on search engines to receive access and updates to information of interest to an Internet user. For the foregoing and other reasons, most individuals and businesses do not use search engines as a tool to methodically and efficiently obtain access and updates to information of interest.

Accordingly, there is serious need in the art for an intelligent process that can assist computer users using the Internet to automatically and efficiently sift through the vast amount of information contained in the Internet, focus on the Internet sites and Web sites of interest, and present information of interest and updates to information of interest contained in such Internet and Web sites. Intelligent processes or software agents are species of Artificial Intelligence (AI) and include applications that assist computer users to use the tools available on the computer system and exhibit human intelligence and behavior such as robots, expert systems, voice recognition, natural and foreign language processing.

Moreover, there is serious need in the art for an Internet application that constantly searches for updates to information of interest to an Internet user and alerts the user of any updates to the information on the sites of interest as soon as such updates occur. There is also need in the art to communicate the collected information of interest and updates to such information to the user in a manner such that the user remains alert and interested in the information.

SUMMARY OF THE INVENTION

The present invention is an intelligent assistant for use with a local computer and with the Internet. The invention's intelligent assistant process includes various menus and training options for training the intelligent assistant to respond to various text, voice, and mouse gesture commands. In its preferred embodiment, the invention's intelligent assistant is represented by an animated character. For example, the intelligent assistant can communicate back to the user through text, voice, and its own animated gestures.

The invention's intelligent assistant automatically and constantly communicates with Internet sites of interest to a user and collects information of interest from those Internet sites. The collected information and updates to the collected information, including information that may not be displayed by a web browser, are then communicated to the user in a variety of ways, including changing the behavior and knowledge base of the intelligent assistant. For example, the invention may communicate the collected information of interest or updates to such information by text, voice, or by simply changing the shape of the animated character. The variety of different ways of communicating the information and updates to the information of interest keeps the user alert and interested in the information. In one embodiment of the invention, only those Internet sites that are authorized can be accessed by the intelligent assistant to gather information or updated information of interest to the user.

The invention has thus met a serious need in the art to efficiently, automatically, and constantly seek the information of interest to a user in the various Internet sites, including those Internet sites that may not be searched by existing search engines. The invention has also met the serious need of presenting such collected information and updates to such information, including information that may not be displayed by a web browser, to the user in a manner such that the user remains alert and interested in the information.

BRIEF DESCRIPTION OF THE DRAWINGS

FIG. 5B is a list of generic commands and intelligent assistant commands used in an embodiment of the present invention.

DETAILED DESCRIPTION OF THE INVENTION

In the following detailed description of the present invention, an intelligent assistant for use with a local computer and with the Internet, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

I. Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Computer System 112

Figure 1:
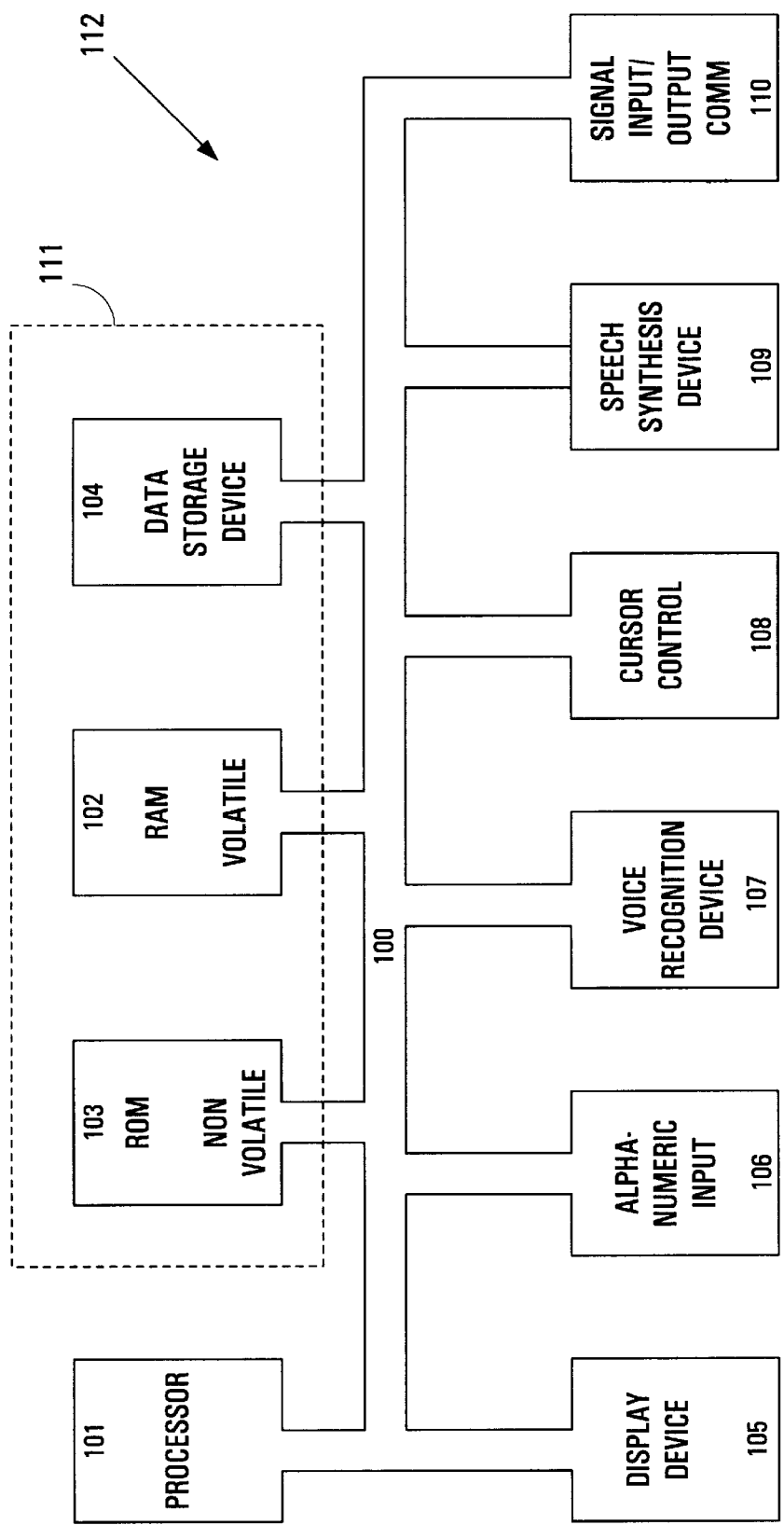
FIG. 1 shows a general purpose computer system in which different embodiments of the invention's intelligent assistant process can be implemented.

Aspects of the present invention, described below, are discussed in terms of steps executed on a computer system. Although a variety of different computer systems can be used with the present invention, an exemplary computer system 112 is shown in FIG. 1.

In general, computer systems 112 that can be used by the present invention comprise an address/data bus 100 for communicating information, a central processor 101 coupled with the bus for processing information and instructions, a memory area 111 including a volatile memory 102 (e.g., random access memory) coupled with the bus 100 for storing information and instructions for the central processor 101, a non-volatile memory 103 (e.g., read only memory) coupled with the bus 100 for storing static information and instructions for the processor 101 and a data storage device 104 ("disk subsystem") such as a magnetic or optical disk and disk drive coupled with the bus 100 for storing information and instructions.

Computer system 112 also includes a display device 105 coupled to the bus 100 for displaying information to the computer user.

Also included in computer system 112 are three sources of receiving input directly from a user. One input source is an alphanumeric input device 106 including alphanumeric and function keys coupled to the bus 100 for communicating information and command selections to the central processor 101. Generally, alphanumeric input device 106 is called a keyboard or keypad. Computer system 112 may also receive input via a voice recognition device 107. The voice recognition device communicates information and commands from the user to the central processor 101 via the bus 100. A further input source in computer system 112 is a cursor control or directing device, e.g. a mouse 108 coupled to the bus for communicating user input information and command selections to the central processor 101. The cursor directing device 108 is typically controlled by user movement which causes a cursor image displayed on screen 105 to move accordingly.

Computer system 112 also includes a speech synthesis device 109 for voice communication from the computer system to the user. The speech synthesis device 109 receives information from the processor 101 via the bus 100.

Computer system 112 of FIG. 1 can also include a signal communication generating device 110 coupled to the bus 100 for interfacing with other networked computer systems, e.g. the Internet. The display device 105 of FIG. 1 utilized with the computer system 112 of the present invention may be a liquid crystal device, other flat panel display, cathode ray tube, or other display device suitable for creating graphic images and alphanumeric characters recognizable to the user.

In one embodiment of the present invention, the computer system 112 is a Windows Operating System based computer system having an x86 architecture processor 101. Alternatively, the computer system 112 could be an Apple computer platform.

III. Intelligent Assistant

The present invention describes a unique type of intelligent software agent which is hereinafter called an "intelligent assistant." By way of overview, a type of intelligent software agent that recognizes mouse gestures and is trained by user's mouse gesture has been described in a pending patent application entitled "A Method and System for Gesture Category Recognition and Training Using a Feature Vector," Ser. No. , filed on Feb. 19, 1998, and assigned to the assignee of the present application. That pending patent application is hereby fully incorporated by reference into the present patent application. The pending patent application entitled "A Method and System for Gesture Category Recognition and Training Using a Feature Vector," describes a method to add to the intelligent software agent's skills the ability to learn to recognize user mouse gestures and also the ability to learn from the user what to do when a previously trained mouse gesture category is recognized.

In contrast, the intelligent assistant of the present invention is a unique type of intelligent agent in that it can, among other things, interface between the user and the Internet. More particularly, the intelligent assistant of the present invention detects and collects information from authorized Internet Web sites on behalf and to the benefit of a user of the intelligent assistant. The information thus detected and collected is presented to the user in a variety of ways. For example, the intelligent assistant may present the information by way of a speech synthesizer, text, or by way of changing the shape and movements of an animated character. Moreover, the information thus detected and collected is learned by the intelligent assistant and is added to the knowledge base of the intelligent assistant, hence extending and enhancing the intelligent assistant's 210 knowledge, skills and capabilities.

Figure 2:
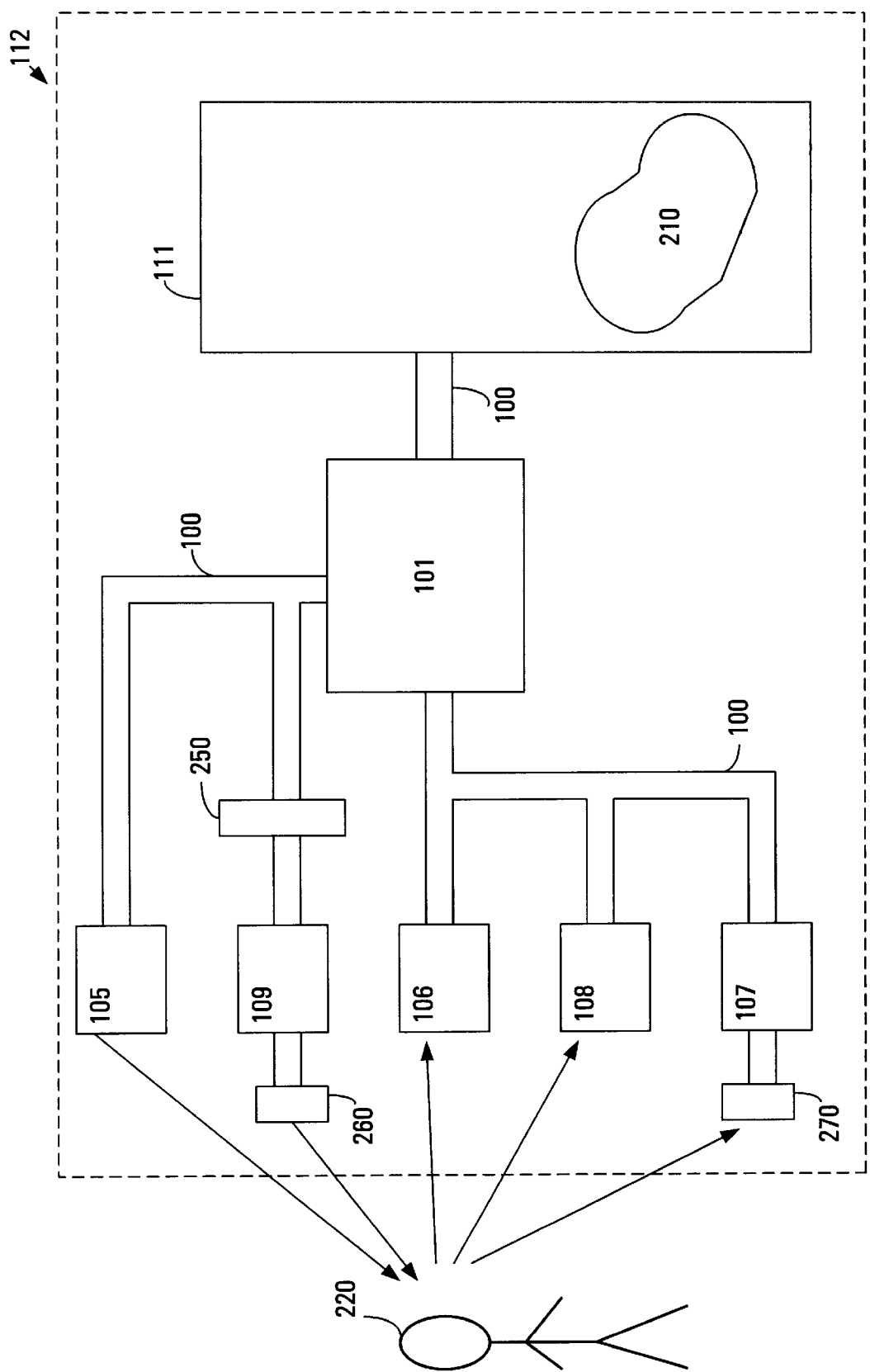
FIG. 2 is a block diagram of the invention's intelligent assistant process in communication with a user.

FIG. 2 is a high level diagram of the computer system 112 embodying the intelligent assistant 210 of the present invention. The intelligent assistant 210 includes procedures, processes and steps which reside on data bits within the memory area 111. In a preferred embodiment, the intelligent assistant 210 has a pictorial representation on the display device 105 and communicates with the user through that pictorial representation. For example, in the preferred embodiment, the intelligent assistant 210 is portrayed as an animated character. In one embodiment, the animated character is represented as a parrot 300, see FIG. 3, but could be represented using any graphic image.

The intelligent assistant 210 incorporates core technologies of artificial intelligence. In the preferred embodiment, the intelligent assistant 210 exhibits human type intelligence and behavior including reasoning, voice recognition, ability to learn or adapt through experience, ability to follow policies, data mining (for example, analyzing business data to uncover any patterns of activity), pattern recognition and natural language understanding. The intelligent assistant 210 usually runs in the background and is able to carry out its actions with a certain level of autonomy based on its programmed skills, knowledge bases, goals, models and learned skills through experience. In short, the intelligent assistant 210 has an intelligent synthetic personality.

The intelligent assistant 210 not only performs the above mentioned tasks but also provides a human-like personality for the computer system 112. The intelligent assistant 210 is aware of its environment and communicates with the user 220. For example, in the preferred embodiment which includes the parrot 300, the parrot 300 inhabits the display device 105, swooping from place to place, resting on dialog boxes and windows. When a new window is opened by the user 220, the parrot 300 flies to the new window and rests on that window. The parrot 300 may also follow the user 220 from window to window and rest on the active window.

Turning back to FIG. 2, the user 220 may communicate with the intelligent assistant 210 via any of several input sources, namely, the keyboard 106, the mouse 108, and the voice recognition device 107 (a microphone 270 provides input to the voice recognition device 107 as shown in FIG. 2). The user 220 can issue commands to or communicate with the intelligent assistant 210 by typing on the keyboard 106. The intelligent assistant 210 can also receive input from the user 220 by associating an icon with a command. For example, the user 220 may simply drop an icon, such as the Netscape Navigator icon, and the intelligent assistant executes the command by running the Netscape Navigator browser. Additionally, the intelligent assistant 210 can receive input from advanced input devices such as video camera and other sensors (not shown) connected to the computer system 112. The user 220 may also communicate with the intelligent assistant 210 by mouse gestures using the mouse 108 or by voice commands entered via the microphone 270 which provides input to the voice recognition device 107.

The voice recognition device 107 is used to provide input to the invention's intelligent assistant by converting spoken words into computer text. Speech is first digitized and then matched against a dictionary of coded waveforms. The matches are converted into text as if the words were typed on the keyboard. It may be beneficial that the user 220 enunciate samples into a microphone 240 in order to tune the voice recognition device to the user's 220 individual voice. However, the voice recognition device used to provide input to the intelligent assistant 210 can recognize many vocabularies such as numeric digits, words, and phrases, without any tuning. In one embodiment, the intelligent assistant 210 does not require training to recognize speech in some languages, such as English.

Figure 3:
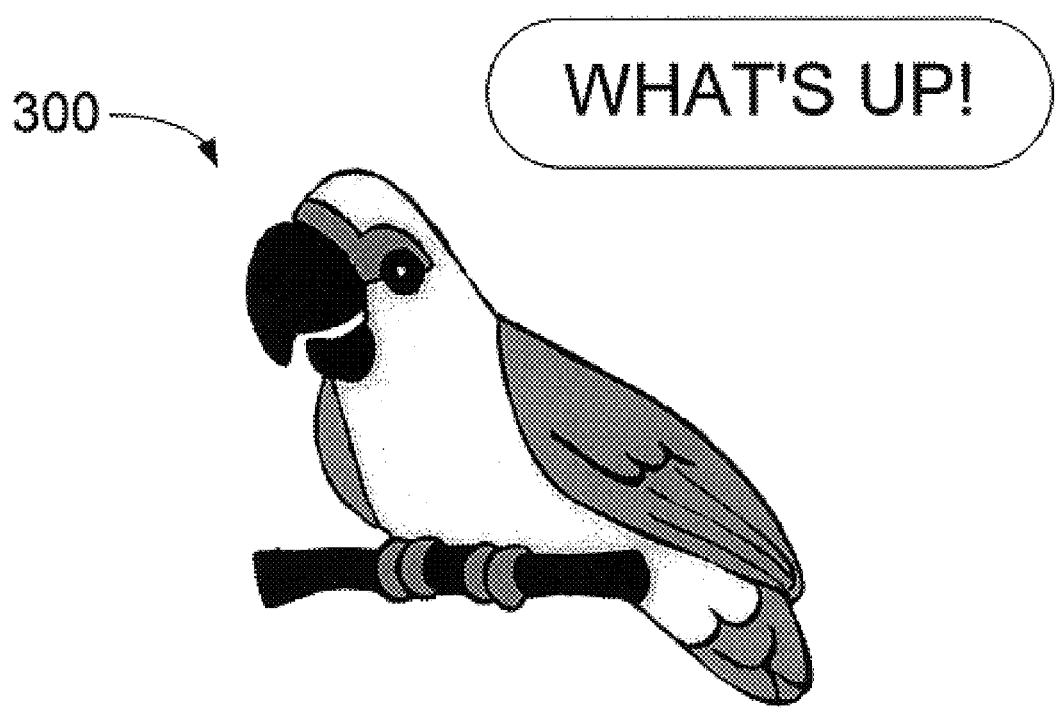
FIG. 3 is one embodiment of the invention in which the intelligent assistant is represented as an animated character, e.g. as a parrot with an optional text bubble.

The intelligent assistant 210 can respond to or communicate with the user 220 in three different ways as well. The intelligent assistant 210 can respond to the user 220 through text, e.g., the intelligent assistant 210 can display text on the display device 105. For example, the text appears in a text balloon or dialog box next to the parrot 300 as shown in FIG. 3.

The intelligent assistant 210 may also communicate through speech via the speech synthesis device 109. The speech synthesis device 109 generates machine voice by arranging phonemes (k, ch, sh, etc.) into words. The speech synthesis device 109 is used to turn text into spoken words. To achieve this task, the speech synthesis device 109 performs real time conversion without a pre-defined vocabulary. Also, the individual spoken words can be digitized into the computer.

Referring to FIG. 2, the speech synthesis device 109 feeds from a sound board 250 which is usually an expansion board for the computer system 112. The sound board 250 is capable of recording and playing back sounds, providing outputs to a speaker 260 through the speech synthesis device 109. The invention's intelligent assistant 210 utilizes a standard audio device 250 connected to the computer system 112, such as the Creative Sound Blaster for Windows/Intel system.

As the third form of communication, the intelligent assistant 210 may communicate with the user 220 through animation or gesture. For example, the parrot 300 may scratch its head when it does not understand the user's command.

The various ways in which the intelligent assistant 210 communicates with the user 220 (e.g. through text, voice, and animation) are intended to provide information to the user 220 while keeping the user 220 alert, entertained and interested in the information. For example, the intelligent assistant 210, through parrot 300, sings, jokes and entertains the user 220. In order to keep the user 220 alert and interested, the parrot 300 can also behave as a pet. When acting as a pet, the parrot 300 asks for food when hungry and should be fed or it perishes. The parrot 300 jokes with the user 220. The user 220 can use the mouse 108 to tickle, nudge, drag, or chase the parrot 300. The parrot 300 may have an ornery side as well. The parrot 300 sometimes complains when it is tired or when he is trying to take a nap. All of these different types of behavior of the parrot 300 are intended to keep the user 220 alert and also present information to the user 220 in a way that the user 220 likes to receive such information and in a way that the user 220 is most likely to remember the information presented.

Figure 4:
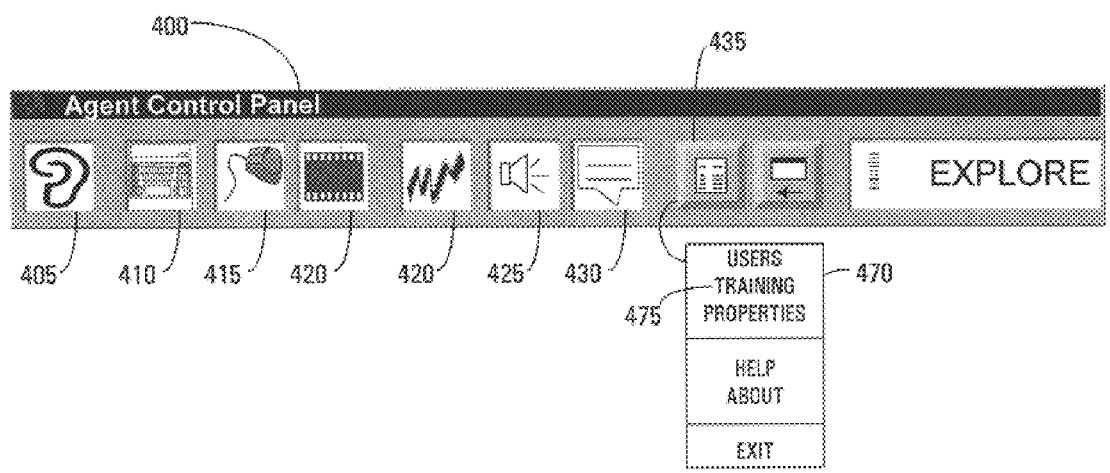
FIG. 4 shows a control panel that is used for controlling, customizing, and setting up various operations of the invention's intelligent assistant process.

FIG. 4 illustrates a displayed control panel 400 through which the user 220 may control and train the intelligent assistant 210, including controlling input/output modes of communication with the intelligent assistant 210. For example, the user 220 may activate or deactivate the voice recognition device 107 by a single mouse click on the ear button 410. The control panel 400 also allows the user 220 to activate/deactivate the keyboard input 106 and mouse input 108 via the keyboard button 415 and the mouse button 420, respectively. As for the output modes, the user 220 may activate/deactivate the speech synthesis device 109 by a single click on the speaker button 425. The user 220 can also activate/deactivate the intelligent assistant's 210 ability to respond or communicate in text by clicking on the text balloon button 430.

As further shown in FIG. 4, the user 220 is also given the option of displaying or not displaying the intelligent assistant 210 as an animated character, e.g. parrot, on the display device via the animation button 420. The control panel 400 also includes a menu button 435. A mouse 108 click on the menu button 435 will pop a menu window 470. The menu window 470 contains commands and has a training section 475 which may be selected by scrolling down and clicking on the word "training". This action will open a training dialog box 500 (shown in FIG. 5A).

Figure 5A:
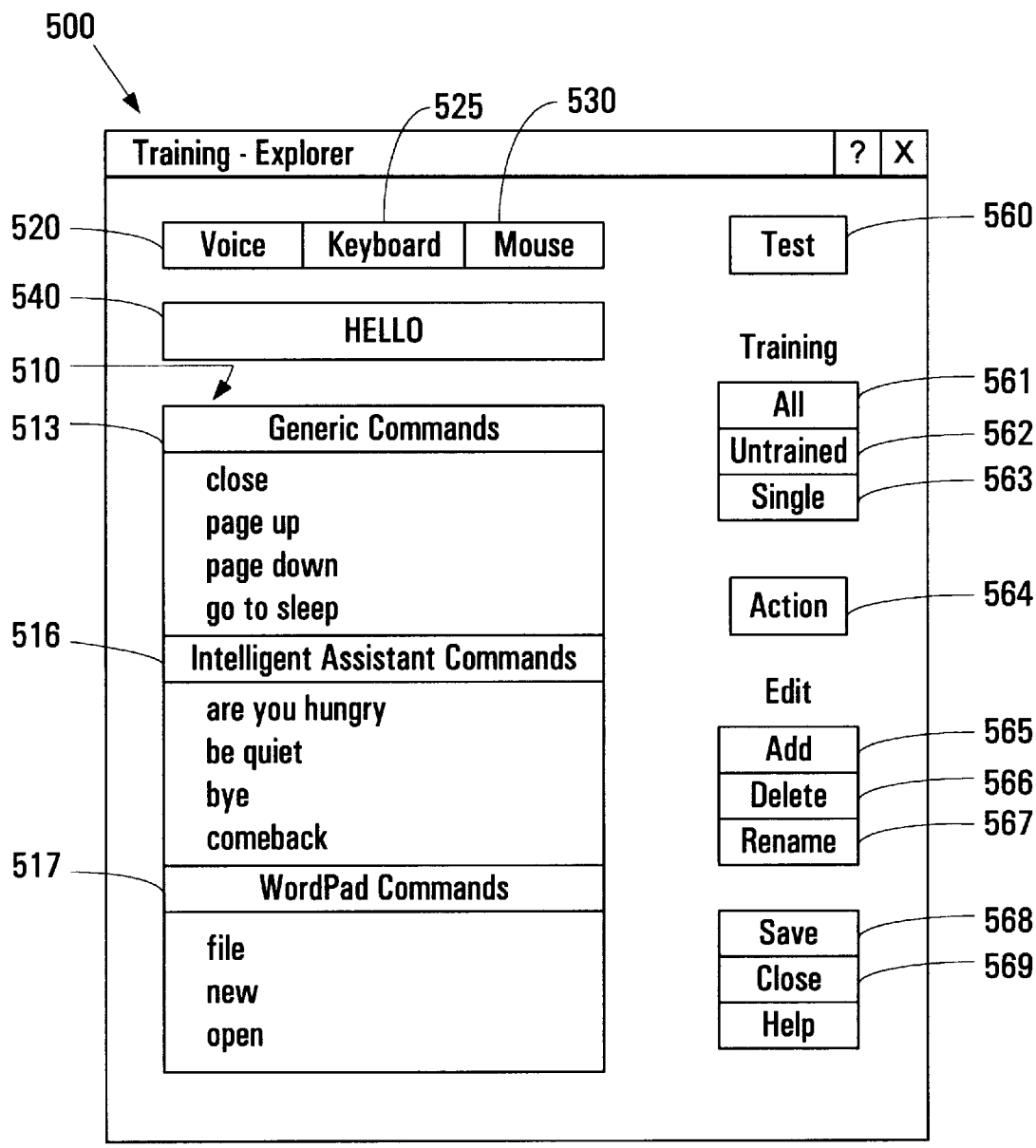
FIG. 5A shows the training dialog for training the invention's intelligent assistant process.
Figure 5C:
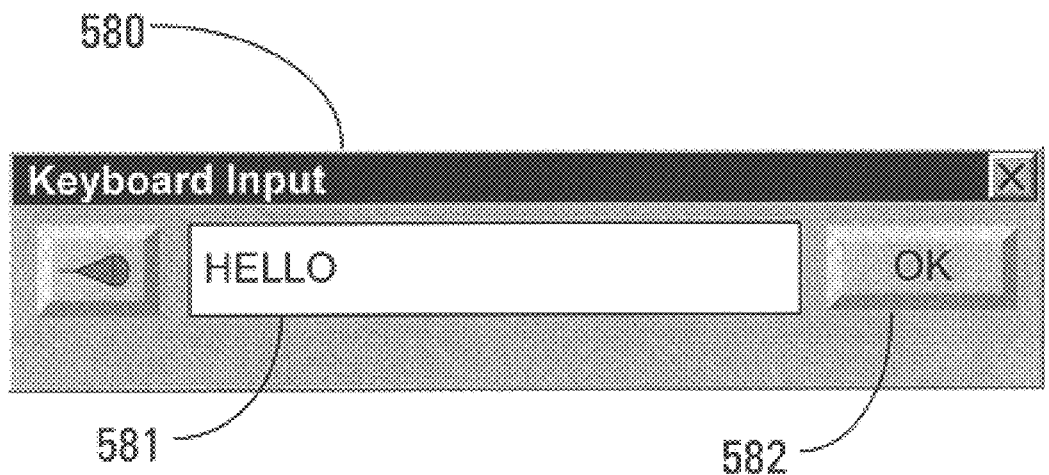
FIG. 5C illustrates a text input window.

As an example, the user 220 may choose keyboard input by clicking on the keyboard button 415 to activate the text command option shown in FIG. 5C. Once the keyboard input is activated, the user 220 may press a key combination such as SHIFT+ESC on the keyboard 106. This key press will pop a keyboard input dialog box 580 on the display device 105. The user 220 may then type a command into the text box 581. As the user 220 begins to type a command, the command word that best matches the characters typed thus far appears in the text box 581 even before the user 220 finishes typing the command. The user 220 can submit the command at any time by pressing the Enter key or by clicking the OK button 582.

FIG. 5A illustrates the training dialog box 500 for training the intelligent assistant 210. The training dialog box 500 allows the user 220 to select any of the commands in the dialog box 500 to train the intelligent assistant 210. The training dialog box also allows the user 220 to create new commands and actions.

Referring to FIG. 5A, the intelligent assistant 210 includes a set of commands 510 that allow the user 220 to command the intelligent assistant 210. To see a list of the commands 510, the user 220 may type the command "show commands". The user 220 may avoid typing any of the commands 510 by scrolling down or up the list and double clicking on any desired command.

The commands 510 include three types of commands, namely, generic commands 513 intelligent assistant commands 516, and application-specific commands 517. FIG. 5B lists some of these commands that can be dynamically extended.

The generic commands 513 allow the user 220 to perform common and often time-consuming Windows actions such as opening and closing a program, scrolling through a document and so on. For example, the user 220 may type the word 'close" in the command dialog box to execute the command "close" which closes an open window.

The intelligent assistant commands 516 allow the user 220 to communicate with the intelligent assistant 210 and request actions. For example, when the user 220 types the word "HELLO" in the text box 581, the intelligent assistant 210 responds by saying "What's up" if the voice output is selected and/or displays a balloon text "What's up!". As another example, the user 220 may type "tell me a joke" in the text box 581. In response, the intelligent assistant 210 will output one of many prestored jokes in its database. As a further example, the intelligent assistant 210 would record the user's 210 voice in response to the command "record." The intelligent assistant 210 would also suspend its operation in response to the command "go to sleep."

Furthermore, in addition to the commands 510, when a Windows application, such as the WordPad application, is opened, the intelligent assistant 210 extracts the application-specific commands, e.g. WordPad commands, and makes them available to the user 220 in the intelligent assistant 210 command list. For example, in response to a WordPad command "new", the intelligent assistant 210 would open a new WordPad file for the user 220. Such application-specific commands are made available to the user 220 in addition to the commands (e.g. the generic and intelligent assistant commands) discussed above.

In addition to the ability to train the intelligent assistant 210 by text commands, the intelligent assistant 210 can be trained to recognize and perform the user's 220 voice commands via the microphone 270 and the speech recognition device 107. The intelligent assistant 210 can also be trained to recognize the user's mouse gesture commands through cursor control 108.

As an example of training the intelligent assistant 210, the intelligent assistant 210 is trained to perform Window's "minimize" command to minimize an open window with a voice command. The training is accomplished through the following steps. Using the mouse 108, the user 220 clicks on the voice tab 520 of the training dialog box 500. In the generic command set 513, the user 220 scrolls down the command list and clicks on the word "minimize". Next, the user 220 clicks on the single button 563 which displays the voice training dialog box 600.

Figure 6:
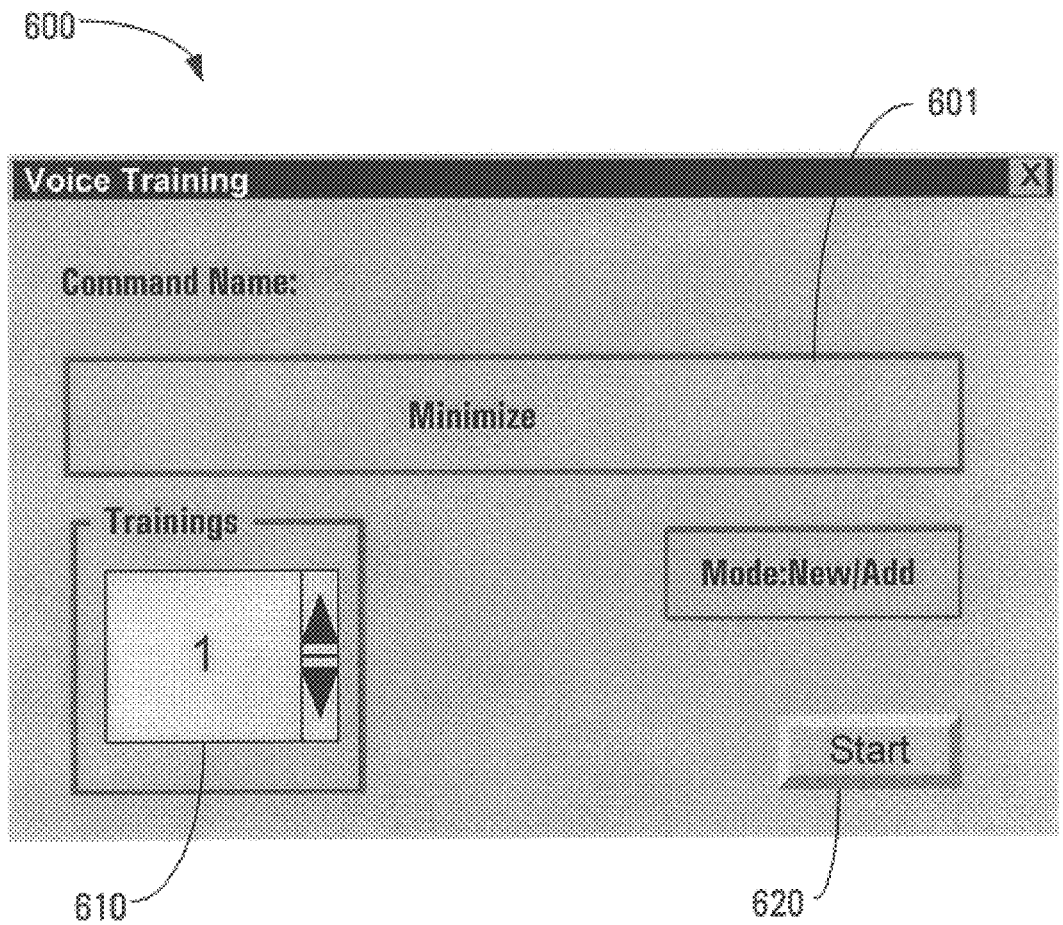
FIG. 6 shows use of a voice training dialog for optionally training the invention's intelligent assistant process to follow voice commands.

FIG. 6 illustrates the voice training dialog box 600 which displays the command name in the command slot 601, e.g. "minimize". The training counter 610 indicates the number of times the user 220 will speak the voice command, e.g. "minimize". The user 220 is then to click on the start button 620 and speak the word "minimize" three times. When the training counter 610 decrements to "2", it means that intelligent assistant 210 received the spoken word. At this point, the user 220 may repeat the same sequence and speak the word "minimize" a second time. After speaking the word a third time, the intelligent assistant 210 has been trained and the voice dialog box 600 closes.

Once the voice training is accomplished, the user 220 should click on the save button 568 (FIG. 5A) to save the newly trained command. From this point on, the user 220 may only say the word "minimize" and the intelligent assistant 210 will minimize the active window. The user 220 may follow the same steps to train the intelligent assistant 210 to perform any other command via voice recognition device 107.

As for the mouse gesture training, the user 220 may train the intelligent assistant 210 similar to the voice training commands. For example, referring to FIG. 5A, the user 220 clicks on the mouse tab 530 to select mouse gesture training. To train the intelligent assistant 210 to launch the calculator, the user 220 may scroll down to the command word "calculator". A single click on the word will select the calculator command for training. This may be acknowledged by highlighting the chosen command. Just as in voice training, the user 220 next clicks on the single button 563 which will pop the mouse gesture training box 700 (FIG. 7).

Figure 7:
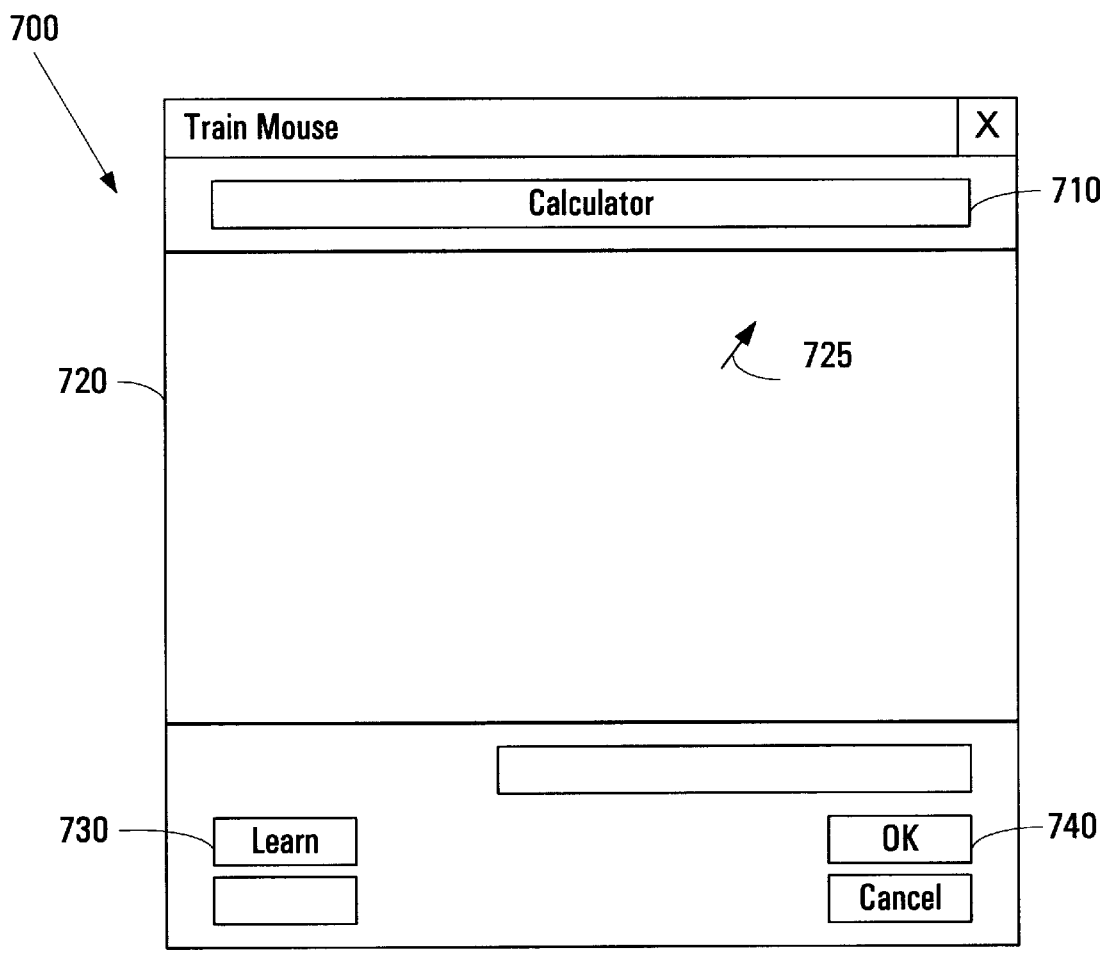
FIG. 7 shows use of a mouse gesture training dialog for training the invention's intelligent assistant process to recognize mouse gesture commands.
Figure 8:
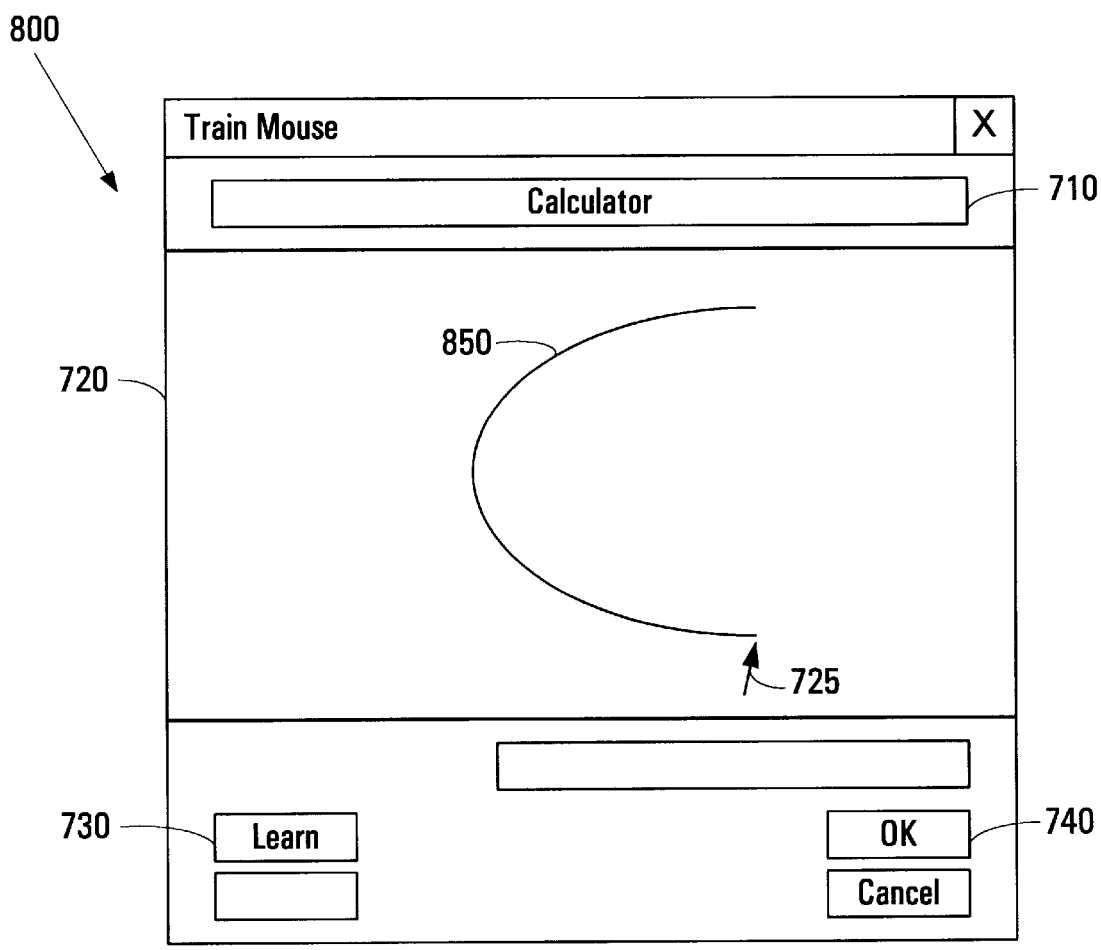
FIG. 8 is an example of a mouse gesture for training the invention's intelligent assistant process.

With reference to FIG. 7, the command word "calculator" is shown in the command box 710 which is positioned above the mouse training pad 720. The user 220 moves the mouse pointer 725 to the mouse training pad 720. At this point, the training may start by pressing and holding the SHIFT key while drawing a gesture which the user 220 wants to associate with launching the calculator application. The gesture may be to draw the letter "C" 850, as shown in FIG. 8. Once the user 220 is satisfied with the gesture, the user 220 may click on the learn button 730. A click on the OK button 740 will close the mouse gesture training box 700 and returns the user 220 to the training dialog box 500. Once the user 220 clicks on the save button 568, the user 220 will be able to launch the calculator application by simply drawing the letter "C" with the mouse pointer and the intelligent assistant 210 will do the rest.

Figure 9:
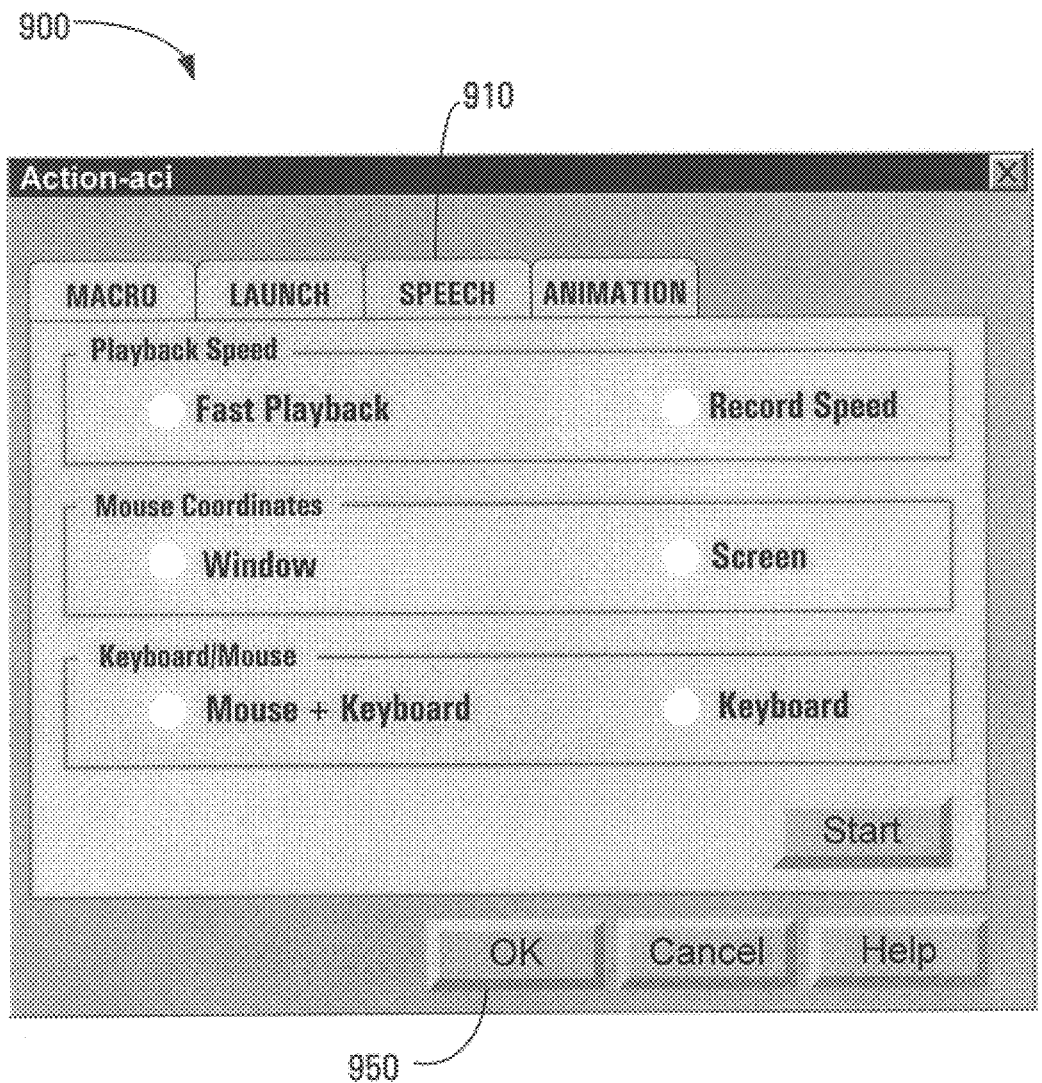
FIG. 9 shows use of an action dialog for training the invention's intelligent process to execute macros for carrying out tasks, launch applications and documents, and use text, speech and animation for communicating with a user.

The intelligent assistant 210 may also be trained to perform new actions for existing commands. For example, the user 220 may train the intelligent assistant 210 to remind the user 220 to check the spelling of a document when the user 220 issues the print command. The intelligent assistant 210 may say "don't forget to check the spelling" and/or display the same in a text balloon. The training comprises of the following steps. The user 220 selects the "print" command in the command list 510 by scrolling down and single clicking on the word "print" which gets highlighted. The user 220 then clicks on the action button 564 which will pop up the action dialog 900 (FIG. 9). In the action dialog 900, as shown in FIG. 9, the user 220 should next click on the speech tab 910 and then type the words "Don't forget to check the spelling", click on OK button 950 and save the training.

As stated above, when an application, such as WordPad is launched, its commands are included in the training dialog box 500 under a new section called the WordPad Commands. The intelligent assistant 210 may be trained to execute any of these WordPad commands as well. To do so, the user 220 may simply scroll down to a new command, e.g. paste, and single click to select and highlight this new command. The paste command may then be trained following the training procedures explained above. For example, for mouse gesture training, the user 220 may draw a "P" in the mouse training pad 720 for the intelligent assistant 210 to perform the "paste" command.

Just as the intelligent assistant 210 can be trained for voice recognition and mouse gesture recognition described above, the intelligent assistant 210 may also be trained to recognize keyboard commands, assign animation, and launch programs stored in the computer system 112. The intelligent assistant 210 can also be trained to perform complex commands, for example scripts containing assistant commands, or macros containing keyboard and mouse events.

IV. Using the Internet with the Intelligent Assistant

Figure 10:
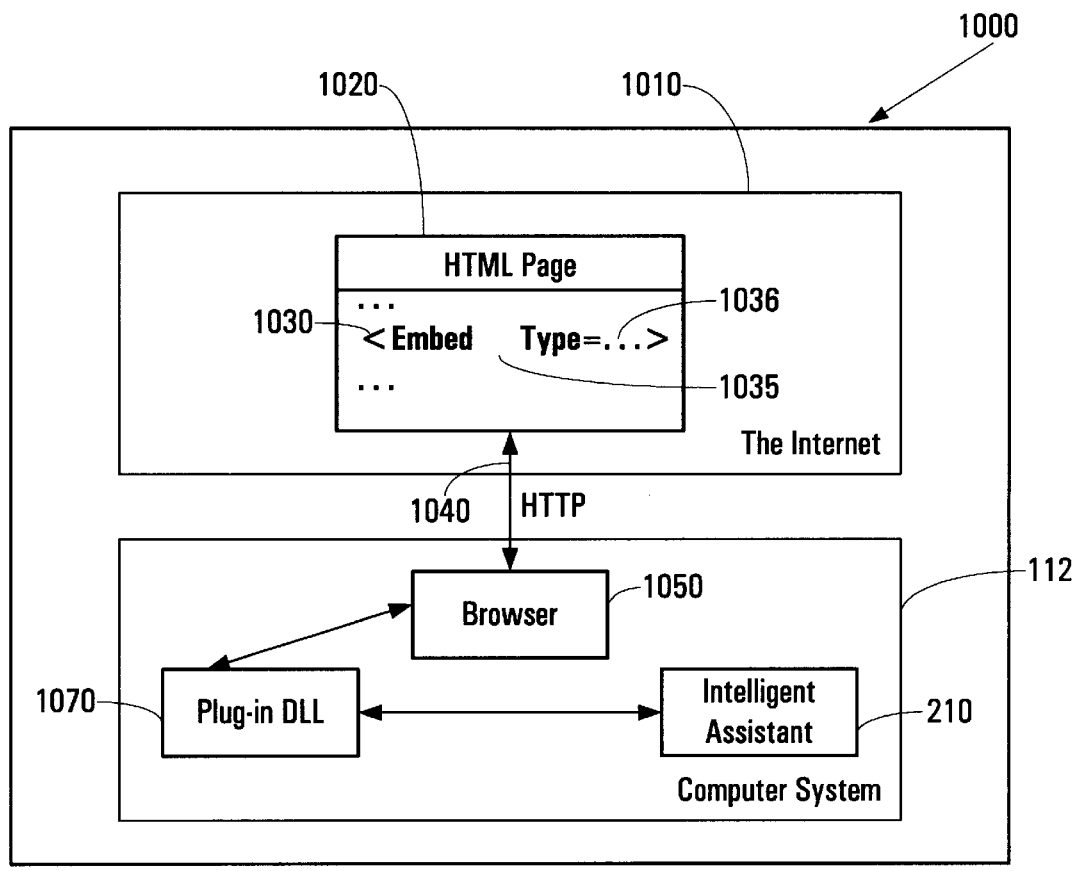
FIG. 10 is a block diagram showing the invention's intelligent assistant process in communication with an Internet site.

FIG. 10 shows the intelligent assistant 210 of the computer system 112 in communication with a Web page 1020 on the Internet 1010. For the intelligent assistant 210 to communicate with the Internet 1010, the computer system 112 is first connected to the Internet 1010 via communication lines (not shown). There are many ways to connect the computer system 112 to the Internet 1010. One option is to connect via a dedicated or leased telephone line, such as a T1 or T3 line. Another option may be to use a dial-in Internet service provider, such as CompuServe. Yet, another option is to use a special cable modem that allows the user 220 to use a coaxial television cable to access the Internet 1010. Once a connection is established, the computer system 112 may receive and/or transmit bits of information over the communication lines.

For the purpose of explaining the operation of the invention's intelligent assistant 210 it is noted that the fundamental Web format is a text document embedded with "HTML" tags that provide the formatting of the page as well as the hypertext links (URLs) to other pages. HTML codes are common alphanumeric characters that can be typed with any text editor or word processor. Numerous Web publishing programs provide a graphical interface for Web page creation and automatically generate the codes. Many word processors and publishing programs also export their existing documents to the HTML format. Thus, Web pages can be created by users without learning any voluminous coding system. The ease of page creation has helped fuel the Web's growth. Web pages are maintained at Web sites, which are computers that support the Web's HTTP protocol. The HTTP (Hyper Text Transport Protocol) is a communications protocol used to connect clients (for example, personal computers) to Web sites.

Returning to FIG. 10, the Internet 1010 includes a Web page 1020 that is in communication with the computer system 1 12 via HTTP 1040 (Hyper Text Transport Protocol) over the communication lines (not shown.) The computer system 112 includes a browser 1050, such as Netscape Navigator, the intelligent assistant 210 and an intelligent assistant plug-in 1070 that is activated by the browser 1050 for communication with the intelligent assistant 210.

Turning to the Internet 1010, it includes the Web page 1020 which is created in a document format called HTML (Hyper Text Markup Language). In the Internet 1010 environment, HTML defines the page layout, fonts and graphic elements as well as the hypertext links to other documents on the Web. The Web page 1020 is built with HTML tags, or codes, embedded in the text. The Web page 1020, in addition to having the basic HTML set of features and tags, includes an intelligent assistant tag 1030 that, like any other HTML tag, is surrounded by the brackets "<", and ">". The intelligent assistant tag 1030 includes an embed or object type attribute 1035.

The embed type attribute 1035 defines a MIME type 1036 (Multipurpose Internet Mail Extensions) of the intelligent assistant plug-in 1070 that is to be activated by the browser 1050. In the Internet 1010 environment, MIME 1036 is a common method for transmitting non-text files via Internet 1010 e-mail, which was originally designed for American Standard for Communication Information Interface (ASCII) text. MIME encodes the files using one of two encoding methods and decodes it back to its original format at the receiving end.

For example, if the MIME type for the intelligent assistant plug-in 1070 is "application/x-HtmlIntelligentAssistant", the following lines may be inserted into the Web page.

<EMBED TYPE="application/x-HtmlIntelligentAssistant" attribute1=value1, . . . , attributeN=valueN>
</EMBED>
or
<OBJECT TYPE="application/x-HtmlIntelligentAssistant" attribute1=value1, . . . , attributeN=valueN>
</OBJECT>

Turning to the computer system 112, the browser 1050, such as Netscape Navigator, requires that the MIME type 1036 for each plug-in be provided to the browser 1050. In the Windows environment, for instance, this requirement is met by placing the MIME type 1036 information supported by the intelligent agent plug-in 1070 into the version resource file of the Windows plug-in module.

When the browser 1050 that is in communication with the Web page 1020 via HTTP 1040 encounters the intelligent assistant tag 1030 with the embed MIME type 1036, this MIME type 1036 is compared and matched with the MIME type stored in the Windows version resource of the intelligent assistant plug-in and as a result the intelligent assistant plug-in 1070 is activated.

The intelligent assistant plug-in 1070 is a software module that runs in an operating system such as Windows to provide communication between different processes running within the computer system. For example, in the present invention, the intelligent assistant plug-in 1070 provides communication between the browser 1050 and the intelligent assistant 210. The intelligent assistant plug-in 1070 is a species of a process that is called a "helper process." A helper process is any process that is called upon by a running application to perform a specific function not performed by the general routine of the running application. In the Windows environment, the intelligent assistant plug-in 1070 is a DLL (Dynamic Link Library) module. The intelligent assistant plug-in 1070 is an executable software module that performs a programmed function. The intelligent assistant plug-in 1070 is not launched directly by users but, as here, it is activated when needed by a running application, such as Netscape Navigator, and loaded to perform a specific function. There are many DLLs that come standard with Windows and that Windows applications depend on and call for as required (e.g., see \WINDOWS\SYSTEM directory for the .DLL extension). Applications, such as Netscape Navigator, may also include their own DLLs, which are usually stored in the application directory.

The DLL module for the intelligent assistant 210 includes the MIME type 1036 in the Version block of the DLL resources. For example, in the case given above, the MIME type field in the Version block of the DLL resources should be: MIMEType="application/x-HtmlIntelligentAssistant".

When the browser 1050 reads the intelligent assistant tag 1030, the browser 1050 begins to search the application folder containing the DLL modules in order to locate the matching intelligent assistant plug-in 1070 with the intelligent assistant 210 MIME type 1036. At that point, the browser 1050 activates the intelligent assistant plug-in 1070 and passes the intelligent assistant tag 1030 and its accompanying information to the intelligent assistant plug-in 1070. At the end, once the browser 1050 leaves the Web page 1020, the browser 1050 deactivates the intelligent assistant plug-in 1070.

Figure 11:
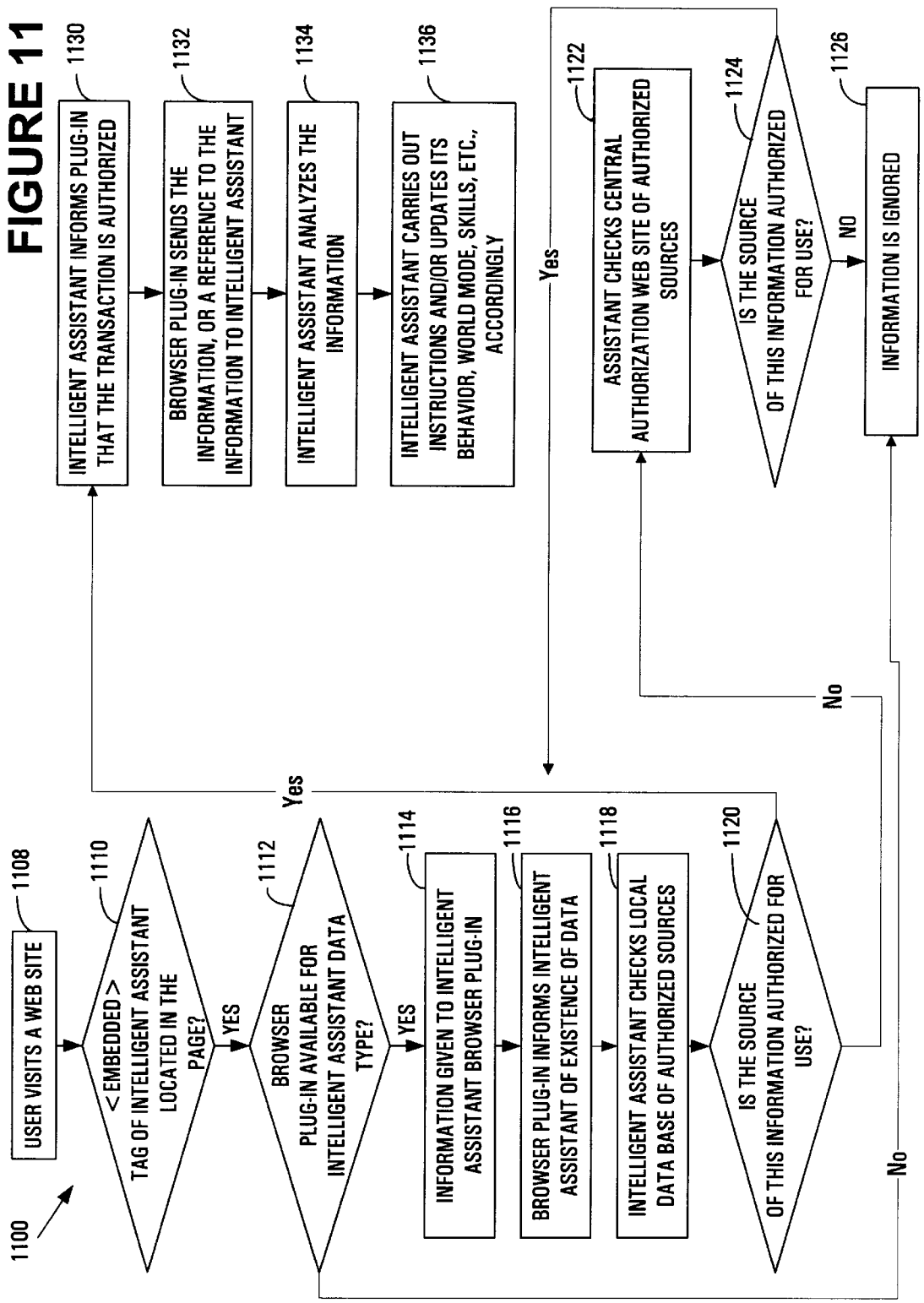
FIG. 11 is a flow chart of steps followed to place the invention's intelligent assistant process in communication with an Internet site and to collect the Internet site information.

FIG. 11 is an illustration of a process 1100 including steps for the user 220 to communicate, via the intelligent assistant 210, with a Web page 1020 located in the Internet 1010 using the browser 1050. It is appreciated that process 1100 is implemented by computer system 112 executing instructions that are stored in the memory area 111 (e.g., RAM 102). Process 1100 can operate in the background simultaneously with other application programs that are running in the computer system 112.

As shown in FIG. 11, the first step is for the user to visit a Web site (step 1108). The process 1100 is invoked upon the browser 1050 encountering the intelligent assistant tag 1030 in the Web page 1020 (step 1110). In other words, step 1110 is triggered when the browser 1050 detects a tag that is surrounded by the angle brackets "<" and ">". In step 1110, the process 1100 compares the encountered tag in the Web page 1020 to determine whether it matches the intelligent assistant tag 1030 for the intelligent assistant 210, e.g., whether EMBED TYPE="application/xHtmlIntelligentAssistant" or OBJECT TYPE="application/x-HtmlIntelligentAssistant".

Step 1110 triggers step 1112 of the process 1100 once the browser finds a match for the intelligent assistant tag 1030 in the Web page 1020. In step 1112, the process 1100 searches for the intelligent assistant plug-in 1070, as explained in the previous section. At this juncture, the intelligent assistant tag 1030 is ignored if the computer system 112 does not include the plug-in 1070 and the process 1100 enters step 1126. Else, once the plug-in 1070 is found, the process 1100 enters step 1114. At step 1114, the browser 1050 passes on the intelligent assistant tag 1030 to the plug-in 1070 and the process 1100 enters the next step, e.g., step 1116. At step 1116, the plug-in 1070 communicates the intelligent assistant tag 1030 to the intelligent assistant 210 and the process 1100 transitions to step 1118.

Step 1118 commences a new phase of the process 1100 which is the authorization phase. Steps 1118 through 1124 are incorporated in the process 1100 for purposes of preventing an unauthorized Web page from utilizing the intelligent assistant 210 for communicating the information in that Web page to the user 220. To be authorized, the Web authorization data or identification must be found either in the storage area of the computer system 112, or in the alternative, must be found at a "central authorization" Web site which has a Web page or other database with a list of authorized Web sites.

Stated differently, at step 1118 of FIG. 11, the intelligent assistant 210 compares the authorization data contained in the intelligent assistant tag 1030 with identification data corresponding to authorized Web pages as stored in the computer system 112. At this point, the process 1100 enters step 1120. At step 1120, an affirmative response means that authorization data in intelligent assistant tag 1030 matched with identification data in the computer system 112 and this would lead the process 1100 to step 1130. A negative response leads the process 1100 to step 1122 where the authorization data contained in the intelligent assistant tag 1030 is compared with identification data corresponding to authorized Web sites as stored in the central authorization Web site. At this juncture, the process 1100 enters step 1124. An affirmative authorization at step 1124 will take the process to step 1130. On the other hand, a mismatch means that the Web page 1020 is not authorized to seek assistance of the intelligent assistant 210 in communicating with the user 220. As a result the process 1100 ends by entering step 1126.

However, once the Web page 1020 is found to be authorized, step 1130 is entered via either step 1120 or 1124. At step 1130, the intelligent assistant 210 communicates with the intelligent assistant plug-in 1070 by transmitting signals or data so as to indicate that the Web page 1020 is in fact authorized to obtain cooperation of the intelligent assistant 210. Next, process 1100 enters step 1132.

At step 1132, the browser 1050 sends the Web site information or a reference to such information, such as another Web site, to the intelligent assistant 210. At this point the process enters step 1134. There, the intelligent assistant 210 receives and analyzes the Web site information. The Web site information may include words to be spoken by the intelligent assistant 210, information to place in the knowledge base of the intelligent assistant 210, or skills which enhance the capabilities of the intelligent assistant 210. One such enhancement may be to enable the intelligent assistant 210 to provide sports statistics and/or predictions to the user 220.

Once the analysis of the site information is performed, the process 1100 enters its final stage, namely step 1136. In that step, the intelligent assistant 210 acts on the received and analyzed Web site information, carries out the instructions, updates its behavior, skills, knowledge base, and world models. For example, the new information may modify the intelligent assistant 210 behavior to be more sarcastic or the new information may expand the intelligent assistant 210 knowledge base so as to advise the user 220 regarding his stock investments in Australia.

According to one aspect of the present invention, following the process 1100, authorized subscribers use the intelligent assistant 210 for advertising their services or products listed on their Internet sites to a person using the intelligent assistant 210 on his or her personal computer. The applications of the present invention are in fact enormous. For instance, the intelligent assistant 210 may act as a sales agent for authorized subscribers or the intelligent assistant 210 may act as an adviser on a variety of subjects that can be transferred to its knowledge base.

For example, the user 220 may obtain various information from an Internet site to enhance the intelligent assistant 210 knowledge base to include auto repair. Using its enhanced knowledge base, the intelligent assistant 210 can help its user to troubleshoot and repair automobile problems. Moreover, to inform the user that it now has an enhanced knowledge base for automobile repair, the intelligent assistant 210 would change the behavior and/or image of its animated character, e.g. the parrot 300, so that the parrot may be dressed in a mechanic's uniform, or that the parrot may change its shape and become a man holding a mechanic's tool, or that the parrot may change its shape and become an automobile or may alter its voice, etc.

As a further example, the intelligent assistant 210 may act as a sales person for an authorized toy company by alerting the user 220 of new toy arrivals. The intelligent assistant 210 may act on information on the Internet site of an authorized toy company and alert the user 210 by modifying the shape of the parrot 300 to present the new toys. Of course, the parrot 300 may communicate the information and act as a sales person by simply announcing the arrival of a new line of toys to the user 220, or other information obtained from the Web site.

Furthermore, the intelligent assistant 210 may obtain Web site information that increases the mouse gestures recognized by the intelligent assistant 210. For example, the Web site information may enhance the intelligent assistant 210 knowledge base for using a Computer Aided Design (CAD) program. As part of this enhancement, the Web site information can also increase the mouse gestures so that the intelligent assistant 210 would recognize the mouse gesture "X" to mean "crossing out or deleting" selected parts of a drawing.

Also, the Web site information may increase the voice commands recognized by the intelligent assistant 210. For instance, the user 220 may want the intelligent assistant 210 to act as a patent searcher. In addition to enhancing the intelligent assistant 210 knowledge base to act as a searcher, the Web site information can also enhance the voice commands recognized to include the word "patent", such that the user 220 can ask the intelligent assistant 210 to retrieve, for example, U.S. Pat. No. 5,123,456.

In addition, the keyboard commands can also be increased by the Web site information. As part of enhancing the intelligent assistant 210 knowledge base to act as a tax lawyer, the Web site information may increase the keyboard commands to add commands such as "capital gain" so the user 210 can seek advice on that subject from the intelligent assistant 210.

In short, the process 1100 causes the intelligent assistant 210 to detect and collect Web site information from authorized Internet sites and, based on the detected and collected Web site information, enhance, update or modify the intelligent assistant 210 skills, knowledge base, and behavior to serve the user 220. As described above, the Web site information can increase the voice commands, keyboard commands and mouse gestures recognized by the intelligent assistant 210.

Figure 12:
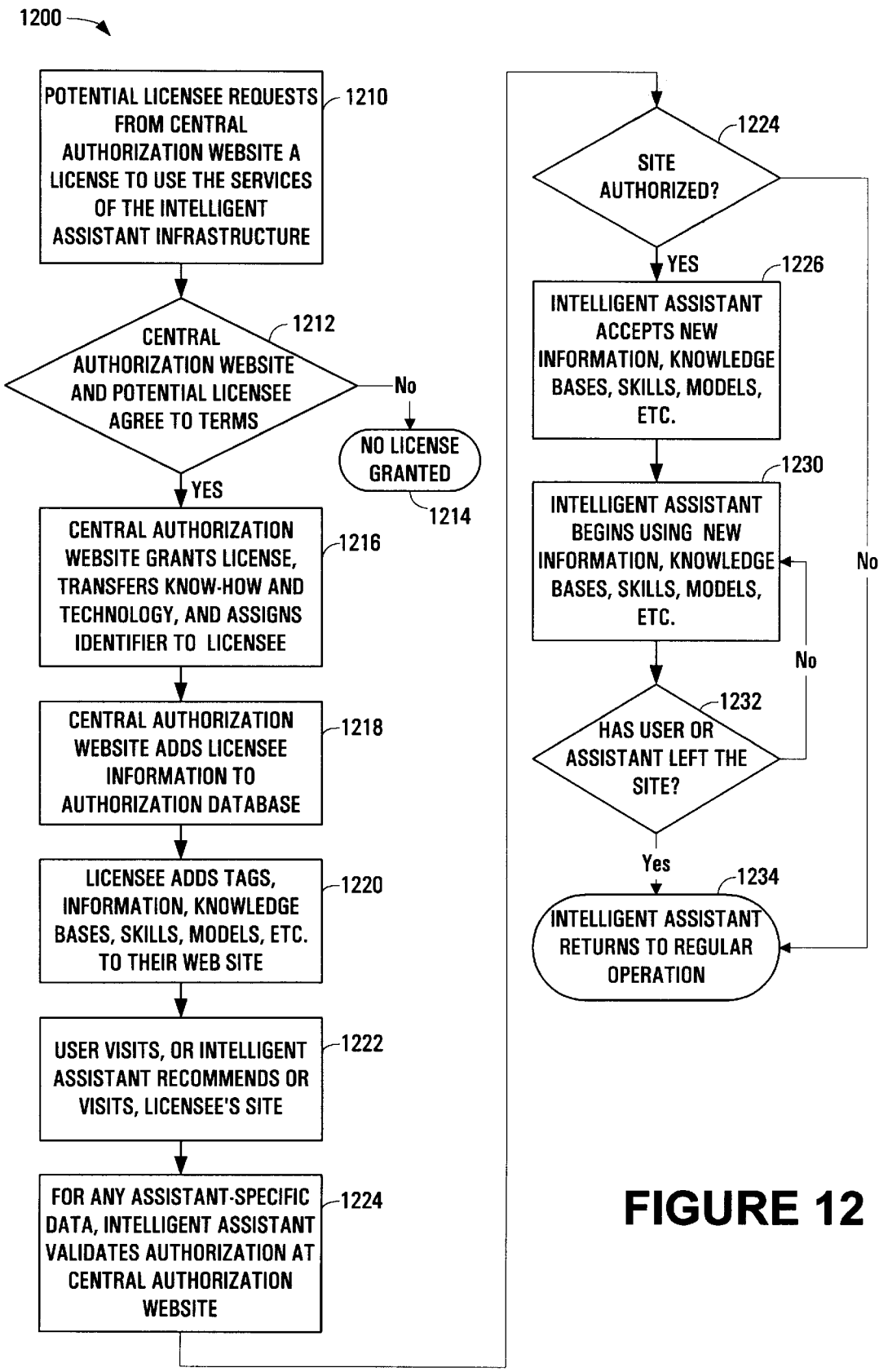
FIG. 12 is a flow chart of steps followed to license the services of the invention's intelligent assistant process so a licensee can provide its Internet site information through the intelligent assistant process to computer users.

FIG. 12 shows a process 1200 comprising steps for licensing the services of the intelligent assistant 210 so that the intelligent assistant 210 can provide information and perform tasks on behalf of a licensee. Following the steps 1210 through 1234, a licensee can use the infrastructure of the intelligent assistant 210, as assistant-for-hire, perform tasks such as information delivery on the licensee's behalf.

Process 1200 begins with step 1210 where a potential licensee requests from the central authorization Web site a license to use the services of the intelligent assistant 210 infrastructure. Process 1200 then continues to step 1212. At step 1212, the central authorization Web site and the potential licensee either agree on the license terms and move to step 1216 or no agreement is reached, in which case process 1200 moves on and ends at step 1214.

Assuming, an agreement is reached, at step 1216, the central authorization Web site transfers the technology and know-how required to build knowledge bases, skill sets, and models for the intelligent assistant 210. At step 1216, the central authorization Web site also assigns the licensee an identifier. At step 1218 which is the next step, the central authorization Web site adds the licensee's information and identifier to its database. Process 1200 then enters step 1220 wherein the licensee adds the intelligent assistant tags 1030 embedding information, knowledge bases, skills, models and etc. to the licensee's Web site according to the technology transferred in step 1216.

Moving on to the next step or step 1222, the user 220 visits the licensee's Web site either on his own, based on the intelligent assistant's 210 recommendation or autonomously by the intelligent assistant. Process 1200 enters step 1224. At step 1224, when the intelligent assistant 210 encounters the intelligent assistant tag 1030 or the intelligent assistant 210 specific data, the intelligent assistant 210 attempts to validate the licensee's authorization by searching through the central authorization Web site database for the licensee's information. At step 1226, if the licensee is authorized to use the services of the intelligent assistant 210, process 1200 moves to step 1228, else process 1200 ends at step 1234.

Assuming that the intelligent assistant 210 encountered an authorized Web site, at step 1228, the intelligent assistant 210 incorporates new information, knowledge bases, skills, models and etc. from the authorized licensee's Web site into its own. Next, at step 1230, the intelligent assistant 210 allows the licensee's Web site to use the services of the intelligent assistant 210. Process 1200 then enters step 1232 wherein process 1200 is returned to step 1230 so long as the user 220 or the intelligent assistant 210 is still visiting the licensee's Web site. When the user 220 or the intelligent assistant 210 leaves the licensee's Web site, process 1200 terminates by entering step 1234. The intelligent assistant 210 may retain some or all of the knowledge, skills, and models it has learned after the process 1200 terminates.

As an example of using process 1200, assume Toys-R-Us requests a license from the central authorization Web site. The central authorization Web site grants a license and assigns Toys-R-Us an identifier and adds the identifier to the authorized licensee database. With the know-how and technologies from the central authorization Web site, Toys-R-Us adds intelligent assistant tags 1030, information, knowledge bases, skills sets and models to their site. Upon arrival of the user 220 having the intelligent assistant 210 at his service, the intelligent assistant 210 can, after successful verification of the licensee use the intelligent assistant 210 specific data, download a behavior file to become a toy salesperson, download new animation to resemble Geoffrey the Giraffe, and download the latest information about the toys available on the site. The intelligent assistant 210 has now become an agent working on behalf of Toys-R-Us for the duration of the user's 220 stay at the Toys-R-Us Web site. The intelligent assistant 210 may also have itself permanently extended or enhanced because of what it has learned from the Toys-R-Us Web site.

While the present invention has been described in a particular embodiment, it should be appreciated that the present invention should not be construed as limited by such an embodiment, but rather construed according to the claims. For example, in light of the present disclosure, it would be obvious to one of ordinary skill in the art to implement an embodiment with an intelligent assistant for use by multiple users or an embodiment with multiple intelligent assistants running on one computer system.

Thus, an intelligent assistant for use with a local computer and with the Internet has been described, wherein information obtained from the Internet alters the behavior of the intelligent assistant.

I claim:

1. In a computer system having a processor, a memory unit, an input device and an output device, a method for collecting site information from an Internet site, said method comprising computer implemented steps of:
   executing an intelligent assistant process on said computer system;
   establishing communication with said Internet site;
   detecting an intelligent assistant tag in said Internet site, said intelligent assistant tag containing embedded information;
   authorizing said computer system to collect said site information from said Internet site when said embedded information corresponds to a plug-in process of said intelligent assistant;
   collecting said site information from said Internet site; and
   altering said intelligent assistant process based on said site information.

2. The method of claim 1 wherein said Internet site comprises data in HTML format, and wherein said intelligent assistant tag is included in said data.

3. The method of claim 1 wherein said detecting step comprises the step of detecting a MIME type enclosed in brackets in said intelligent assistant tag.

4. The method of claim 1 wherein said detecting step comprises the step of detecting a MIME type enclosed in brackets in said Internet site.

5. The method of claim 1 wherein said embedded information is a MIME type.

6. The method of claim 5 wherein said authorizing step comprises the step of authorizing said computer system to collect said site information from said Internet site when said MIME type corresponds to said plug-in process of said intelligent assistant.

7. The method of claim 1 wherein said plug-in process of said intelligent assistant is a plug-in DLL module.

8. The method of claim 1 wherein said step of altering said intelligent assistant process comprises the steps of:
   enhancing a knowledge base of said intelligent assistance process; and
   altering a behavior of said intelligent assistant process.

9. The method of claim 1 wherein said step of altering said intelligent assistant process comprises the steps of:
   enhancing a skill of said intelligent assistance process; and
   altering a behavior of said intelligent assistant process.

10. The method of claim 1 wherein said step of altering said intelligent assistant process comprises the steps of:

enhancing a model of said intelligent assistance process; and altering a behavior of said intelligent assistant process.

11. The method of claim 1 wherein said step of establishing communication comprises launching a browser on said computer system to communicate with said Internet site.

12. The method of claim 11 wherein said browser is selected from the group consisting of the Netscape Navigator browser and the Microsoft Internet Explorer browser.

13. The method of claim 1 wherein said intelligent assistant process is stored in said memory unit of said computer system.

14. The method of claim 1 wherein said detecting step comprises using said browser to detect said intelligent assistant tag.

15. The method of claim 1 wherein said step of altering said intelligent assistant process comprises the step of modifying said intelligent assistant process according to said site information so as to provide assistance to a user of said Internet site.

16. The method of claim 1 wherein said output device of said computer system includes a display and further comprising the step of said intelligent assistant process being represented as an animated character on said display.

17. The method of claim 16 wherein said animated character is a depiction of a parrot.

18. The method of claim 16 wherein said site information modifies the shape of said animated character.

19. The method of claim 1 wherein said computer system includes a speech synthesis device and further comprising the step of said intelligent assistant process using said speech synthesis device to communicate to a user of said Internet site.

20. The method of claim 1 wherein said step of altering said intelligent assistant process comprises the step of said intelligent assistant process learning new information from a user of said Internet site.

21. The method of claim 1 wherein said step of altering said intelligent assistant process comprises the step of said intelligent assistant process learning new skill from said Internet site.

22. The method of claim 1 wherein said step of altering said intelligent assistant process comprises the step of said intelligent assistant process learning new behavior from said Internet site.

23. The method of claim 1 wherein said step of altering said intelligent assistant process comprises the step of said site information training said intelligent assistant process.

24. The method of claim 1 wherein said computer system includes a voice recognition device, and further comprises the step of said intelligent assistant process recognizing a voice of a user of said Internet site by using said voice recognition device.

25. The method of claim 1 wherein said computer system includes an alphanumeric keyboard, and further comprising the step of a user of said Internet site communicating with said intelligent assistant process via said alphanumeric keyboard.

26. The method of claim 1 wherein said computer system includes a display, and further comprising the step of said intelligent assistant process communicating with a user of said Internet site by displaying textual information and images on said display.

27. The method of claim 1 further comprising the step of a user of said Internet site communicating with said intelligent assistant process via a mouse gesture.

28. The method of claim 1 further comprising the step of a user of said Internet site communicating with said intelligent assistant process via an icon association.

29. The method of claim 1 further comprising the step of a user of said Internet site communicating with said intelligent assistant process via a video camera input.

30. The method of claim 1 further comprising the step of a user of said Internet site communicating with said intelligent assistant process via a sensor input.

31. In a computer system having a processor, a memory unit, an input device and an output device, a method for providing assistance to a user of an Internet site, said method comprising computer implemented steps of:

establishing communication between said computer system and said Internet site;

locating an intelligent assistant tag in said Internet site;

providing said intelligent assistant tag to a plug-in process;

said plug-in process informing an intelligent assistant process of existence of said intelligent assistant tag;

said intelligent assistant process searching a local data base for authorized Internet sites;

said intelligent assistant process causing said plug-in process to collect site information upon said intelligent assistant process finding said Internet site in said authorized Internet sites; and said intelligent assistant process storing said site information and carrying out instructions contained in said site information, wherein a knowledge base, skill or model of said intelligent assistant process is enhanced by said site information.

32. The method of claim 31 wherein said step of establishing communication comprises the step of launching a browser on said computer system to communicate with said Internet site.

33. The method of claim 31 wherein said computer system includes a display and wherein said intelligent assistant process is represented, based on said knowledge base, as an animated character on said display.

34. The method of claim 33 wherein said animated character is a parrot.

35. The method of claim 31 wherein said computer system includes a speech synthesis device and wherein said intelligent assistant process uses said speech synthesis device to communicate to a user of said computer system.

36. The method of claim 31 wherein said computer system includes a voice recognition device, and wherein said intelligent assistant process recognizes voice of a user of said computer system by using said voice recognition device.

37. The method of claim 31 wherein said computer system includes an alphanumeric keyboard, and wherein a user of said computer system communicates with said intelligent assistant process via said alphanumeric keyboard.

38. The method of claim 31 wherein said computer system includes a display, and wherein said intelligent assistant process communicates with a user of said computer system by displaying textual information and images on said display.

* * * * *

UNITED STATES PATENT AND TRADEMARK OFFICE
CERTIFICATE OF CORRECTION

PATENT NO.    : 6,088,731                                                              Page 1 of 1
DATED         : July 11, 2000
INVENTOR(S)   : Jozsef Kiraly, Peter M. Ridge and Zoltan Horvath It is certified that error appears in the above-identified patent and that said Letters Patent is hereby corrected as shown below:

<u>Title page,</u>
Item [75], Inventors, should read -- Zoltan Horvath --

Signed and Sealed this

Twenty-eighth Day of June, 2005

JON W. DUDAS
*Director of the United States Patent and Trademark Office*